United States Patent
Kim et al.

(10) Patent No.: US 6,691,265 B2
(45) Date of Patent: Feb. 10, 2004

(54) METHOD FOR CREATING DEFECT MANAGEMENT INFORMATION IN AN RECORDING MEDIUM, AND APPARATUS AND MEDIUM BASED ON SAID METHOD

(75) Inventors: Byung-Jin Kim, Kyunggido (KR); Ki-Won Kang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/372,183

(22) Filed: Feb. 21, 2003

(65) Prior Publication Data

US 2003/0135800 A1 Jul. 17, 2003

Related U.S. Application Data

(63) Continuation of application No. 09/259,297, filed on Mar. 1, 1999, now Pat. No. 6,564,345.

(30) Foreign Application Priority Data

Mar. 2, 1998 (KR) .............................. 98-7385

(51) Int. Cl.⁷ ............................................. G11C 29/00
(52) U.S. Cl. ...................................... 714/723; 714/747
(58) Field of Search .............................. 369/54, 58, 48; 386/95, 47.14; 714/723, 747

(56) References Cited

U.S. PATENT DOCUMENTS

| | | | | | |
|---|---|---|---|---|---|
| 4,774,700 A | * | 9/1988 | Satoh et al. | .................. | 369/54 |
| 4,949,326 A | * | 8/1990 | Takagi et al. | ................. | 369/54 |
| 5,111,444 A | * | 5/1992 | Fukushima et al. | ........... | 369/58 |
| 5,237,553 A | * | 8/1993 | Fukushima et al. | ........... | 369/58 |
| 5,623,470 A | * | 4/1997 | Asthana et al. | ................ | 369/58 |
| 5,715,221 A | * | 2/1998 | Ito et al. | ........................ | 369/54 |
| 5,737,290 A | * | 4/1998 | Ohmori | ........................ | 369/58 |
| 5,841,748 A | * | 11/1998 | Yamamuro | ................... | 369/58 |
| 5,883,867 A | * | 3/1999 | Yamamuro | ................... | 369/54 |
| 5,966,358 A | * | 10/1999 | Mine | ........................... | 369/58 |
| 6,049,515 A | * | 4/2000 | Yamamuro | ................... | 369/48 |
| 6,160,778 A | * | 12/2000 | Ito et al. | ........................ | 369/54 |
| 6,292,625 B1 | * | 9/2001 | Gotoh et al. | .................. | 386/95 |
| 6,377,524 B1 | * | 4/2002 | Ko | ......................... | 369/47.14 |

* cited by examiner

Primary Examiner—David Ton
(74) Attorney, Agent, or Firm—Lee, Hong, Degerman, Kang & Schmadeka

(57) ABSTRACT

This invention provides a method for creating/writing defect management information of an information recording medium and an apparatus and optical disc based on the method. In the present invention, it depends on the type of data to be reproduced whether or not defective sectors which are detected during reproduction operation are replaced with non-defective sectors. If read-out errors are detected in reproducing non-audio/video data, linear replacement algorithm is applied to the corresponding defective sectors. On the other hand, in case of audio/video data, location information of the corresponding defective sectors is just kept without any sector replacement. Therefore, this invention enables to reproduce audio/video data in real-time regardless of the presence of defective sectors and to avoid writing data to the defective sectors when new data is overwritten to the information recording medium.

28 Claims, 8 Drawing Sheets

*Conventional Art*

Conventional Art

METHOD FOR CREATING DEFECT MANAGEMENT INFORMATION IN AN RECORDING MEDIUM, AND APPARATUS AND MEDIUM BASED ON SAID METHOD

This is a continuation of application Ser. No. 09/259,297 filed Mar. 1, 1999, now U.S. Pat. No. 6,564,345, which application is hereby incorporated by reference in its entirety.

BACKGROUND OF THE INVENTION

1. Field of the Invention

The present invention relates to a method for managing defects which arise in an information recording medium, more particularly, to a method for creating/writing defect management information for an information recording medium, and to an apparatus and an optical disc using the method.

2. Description of the Related Art

Optical discs have come into wide use since the advent of CD (compact disc) and the demand for optical discs is expected to grow steadily with popularization of DVD (digital versatile disc). Optical discs include read-only discs such as CD-ROM and DVD-ROM, write-once discs such as CD-R and DVD-R, and rewritable discs such as CD-RW and DVD-RAM. Standard formats of CD-RW and DVD-RAM have released and standardization for VDR (video disc recorder) is in progress.

For rewritable optical discs such as DVD-RAM, defects which arise in their recording surface should be managed to achieve high reliable write/reproduction operation in a manner that data is not written to sectors in which read-out errors are detected beyond a predetermined level (hereinafter referred to as "defective" or "bad" sectors). To accomplish this, defect management is performed such that addresses of defective sectors are stored in a defect management table on the optical disc and data access to the defective sectors, write or read-out, is prohibited.

As shown in FIG. 1, the rewritable physical area of DVD-RAM has a lead-in area, a data area, and a lead-out area. The data area is divided into contiguous 24 groups, and guard area is situated before and behind each group. Each group is made up of a user area for recording data and a spare area which provides a storage area in place of defective portion of the user area.

The data area is also made up of a plurality of blocks, each of which consists of 16 sectors. The position of each sector is specified by a physical address which is given uniquely to each sector. When data is recorded, LSN (logical sector number) is assigned sequentially to every sector except defective ones.

Defect management information, or physical addresses of defective sectors within the data area are stored in DMA (defective management area), which is provided in four places, two in lead-in area and the other two in lead-out area, as shown in FIG. 1, to protect against the defects which may arise in the four DMA themselves.

The DMA is made up of two ECC (error correction code) blocks, or 32 sectors. The first ECC block consists of one sector for DDS (disc definition structure) and 15 other sectors for PDL (primary defect list).Sixteen sectors of the second ECC block are used for SDL (secondary defect list).

The examples of DDS, PDL, and SDL are illustrated in tables 1, 2, and 3, respectively.

TABLE 1

DDS structure

| location | Size (in byte) | contents |
| --- | --- | --- |
| 0~1 | 2 | DDS identifier (0A0Ah) |
| 2 | 1 | Reserved (00h) |
| 3 | 1 | Disc Certification flag |
| 4~7 | 4 | DDS/PDL, |
| 8~9 | 2 | The number of groups |
| 10~2047 | 2038 | Reserved (00h) |

TABLE 2

PDL structure

| location | Size(in byte) | contents |
| --- | --- | --- |
| 0~1 | 2 | PDL identifier (0001h) |
| 2~3 | 2 | The number of entries in PDL |
| 4~7 | 4 | The 1$^{st}$ bad sector address |
| 8~11 | 4 | The 2$^{nd}$ bad sector address |
| . | . | . |
| . | . | . |

TABLE 3

SDL structure

| location | Size (in byte) | Contents |
| --- | --- | --- |
| 0~1 | 2 | SDL identifier (0002h) |
| 2~3 | 2 | Reserved (00h) |
| 4~7 | 4 | SDL update counter |
| 8~15 | 8 | Spare area full flags |
| 16~21 | 6 | Reserved (00h) |
| 22~23 | 2 | The number of entries in SDL |
| 24~31 | 8 | The 1$^{st}$ bad sector address & the 1$^{st}$ replacement sector address |
| . | . | . |
| . | . | . |

Methods for creating and managing defect management information such as PDL and SDL are explained below with reference to DVD-RAM.

PDL Creation and Management (In Write Operation)

The optical disc, or DVD-RAM is tested by the manufacturer to determine the validity of each sector. To do this, data is written to each sector and then read out from that sector to check whether that sector is bad or not. Sectors in which read-out errors are detected beyond a predetermined level are classified as defective ones at the manufacturing time and their physical addresses are stored in the PDL one after another, as shown in FIG. 1.

If a user requests to write data to the optical disc, a write command is sent to the optical disc drive and then the data begins to be written to unused sectors on the user area sequentially, as shown in FIG. 2. Each time data is written to the target sector, the physical address of the target sector is compared to those of defective sectors in the PDL. If the target sector is matched with one of defective sectors in the PDL, the target sector is skipped and the data is written to the next valid sector. This scheme to compensate for defective sectors is called "slipping replacement".

In case where there is no defective sector on the user area, data is written only on the user area, as shown in the upper layout of FIG. 2. On the other hand, if there are defective sectors in the PDL, as many sectors in the spare area as defective sectors in the user area are used for sector replacement, as shown in the lower layout of FIG. 2.

A sector may become defective due to a deterioration in quality by cyclic reproduction operation of the optical disc. Such a defective sector is referred to as a "grown" defective one. Hence, when data is written to the optical disc, every sector which has not been listed in the PDL is examined to determine if it has a grown defect. Each sector identified as defective one is subjected to the sector slipping algorithm and the address of that sector is added to the PDL to guarantee that data is not written to the defective sector without sector verification process from the next write operation on.

In this way, the number of entries in the PDL increases as the write operation is repeated.

The criterion by which a sector is identified as bad one is as follows. A sector with ECC (hereinafter referred to as "ECC sector") is constructed by data of 182 bytes×13 rows, as shown in FIG. 5, and a PID (physical identification) is assigned uniquely to each sector. The PID is written on each sector at four reserved locations. The sector is determined as defective sector if there are three or more errors in the PID read-out in one sector or if the number of rows having four or more error bytes in one sector is one or more. ECC block is classified as bad one when the number of rows having four or more error bytes in one ECC block is six or more.

SDL Creation and Management (In Reproduction Operation)

When the optical disc is placed into service, sectors on the disc may become defective. Hence, while reproducing the optical disc, sectors which have not been listed in the PDL are examined to determine whether or not they became grown defective sectors. If one sector is determined as bad one, data recorded in 16 logical sectors of the ECC block having the bad sector (bad ECC block) is transferred to a valid ECC block which is available on the spare area sequentially, as shown in FIG. 3. This scheme is called "linear replacement". Then, a pair of the physical address of the first or head sector of the defective ECC block and the physical address of the first sector of the replacement ECC block is stored as an entry of the SDL.

When there is a lack of usable spare blocks in a present group, full flag corresponding to the group in the SDL is set to 1 and valid spare blocks are borrowed for linear replacement from the spare area of another group.

In reproduction operation, each ECC block is determined as bad one if the number of rows having four or more error bytes in one ECC block is eight or more or if there are one or more sectors in which more than three PID read-out arise.

When data is written to or read out from a DVD-RAM, a logical block address which is sent from the associated host computer to a DVD-RAM drive is translated to a physical target address. The PDL is then reviewed to determine if any slip adjustment is needed. That is, the physical target address is compared to those of defective sectors in the PDL. If it is determined that the sector at the physical target address is defective, the defective sector is skipped and the subsequent sectors are examined until a valid sector is found. Then the physical target address is adjusted so as to locate the next valid sector. In reproduction operation, the physical target address is compared to the list of the SDL to check if any sector replacement is required. If the physical target address is matched with one of those in the SDL, the physical target address of the replacement sector is read out from the SDL.

In case of optical disc which is dedicated to moving pictures or speech, it is crucial that the audio/video data is reproduced in real-time. However, the reproduction operation is interrupted for a short period of time corresponding to the sector replacement requiring data movement on the optical disc when grown defective sectors which have not been listed in the SDL are detected during reproduction. In this case, the reproduction speed of data recorded on the defective sectors is lowered, resulting in a short interruption of reproduction of audio/video data.

No management of new defective areas which have not been listed in the PDL and SDL at the reproduction time can be a method for solving the short interruption by the linear replacement. In this case, however, when the already-written audio/video data is erased and then a new audio/video data is overwritten to the VDR, the new data may be written to the defective sectors or blocks. As a result, read-out error of audio/video data which is newly recorded on such defective sectors or bocks cannot be avoid.

SUMMARY OF THE INVENTION

It is therefore a primary object of the present invention to provide a method for creating defect management information which enables to reproduce audio/video data on an information recording medium in real-time regardless of the presence of defective sectors and to avoid writing data to the defective sectors when new audio/video data is recorded to the recording medium, and to provide an apparatus and an optical disc for realizing the method.

To achieve the object, the present invention provides a method for creating defect management information of an information recording medium comprising the steps of detecting the presence of defective areas on an information recording medium on the basis of read-out errors of audio/video data reproduced from the information recording medium; and writing location information of the detected defective areas at a reserved area on the information recording medium, which can be situated adjacent to or separated from a general defect management information area of the information recording medium.

The method for creating defect management information according to the present invention further comprises the step of moving the location information of the detected defective sectors recorded in the reserved area into the general defect management information area, when one of pre-assigned operations such as erasing operation is requested.

An apparatus for creating defect management information of an information recording medium according to the present invention comprises a means for storing the location information of the detected defective areas separately according to whether or not the data to be reproduced is audio/video data or not; and a means for writing the two sets of location information of the detected defective areas into respective reserved areas on the information recording medium.

The apparatus for creating defect management information according to the present invention further comprises a means for obtaining addresses of the area in which data to be erased is recorded; a means for reviewing the storing means keeping the location information, or addresses of audio/video data's detective areas and determining whether or not there is any defective area, address of which is matched with the obtained addresses; and a means for moving the matched addresses between the areas for defect information.

An information recording medium according to the present invention comprises a first area for storing location information of defective areas to avoid writing data to the defective areas on the information recording medium; and a second area for storing information signifying location information of the defective areas in which audio/video data is recorded, the second area being arranged so that it is close to or separated from the first area.

According to the present invention, while reproducing data from the information recording medium, it is checked whether or not there are errors in the read-out of the data being reproduced. In case where read-out errors are detected during reproduction of audio/video data, location information of the corresponding defective areas is stored in a reserved area on the optical recording medium without sector replacement or stored in a portion of the storing means temporarily. The reserved area for the location information may be located close to or separated from the reserved area for general defect management information.

After that, if erasing of data on the information recording medium is requested, the address obtaining means obtains address information of the area in which the data to be erased is recorded. Next, the location information, or addresses of defective areas which are temporarily stored in the storing means are read out and are then compared with the obtained addresses to determine if there are matched addresses. The general defect management information is renewed to include the matched addresses by the moving means.

According to the present invention, it is possible to reproduce audio/video data in real-time regardless of the presence of defective sectors by eliminating reproduction delay which arises due to replacement of defective areas on the information recording medium, and to prohibit data from being written to the defective areas which are detected during reproduction, when new data is written to the information recording medium.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings.

DETAILED DESCRIPTION OF THE PREFFERRED EMBODIMENT

The preferred embodiment of the present invention will be described below in detail referring to the accompanying drawings.

Figure 1:
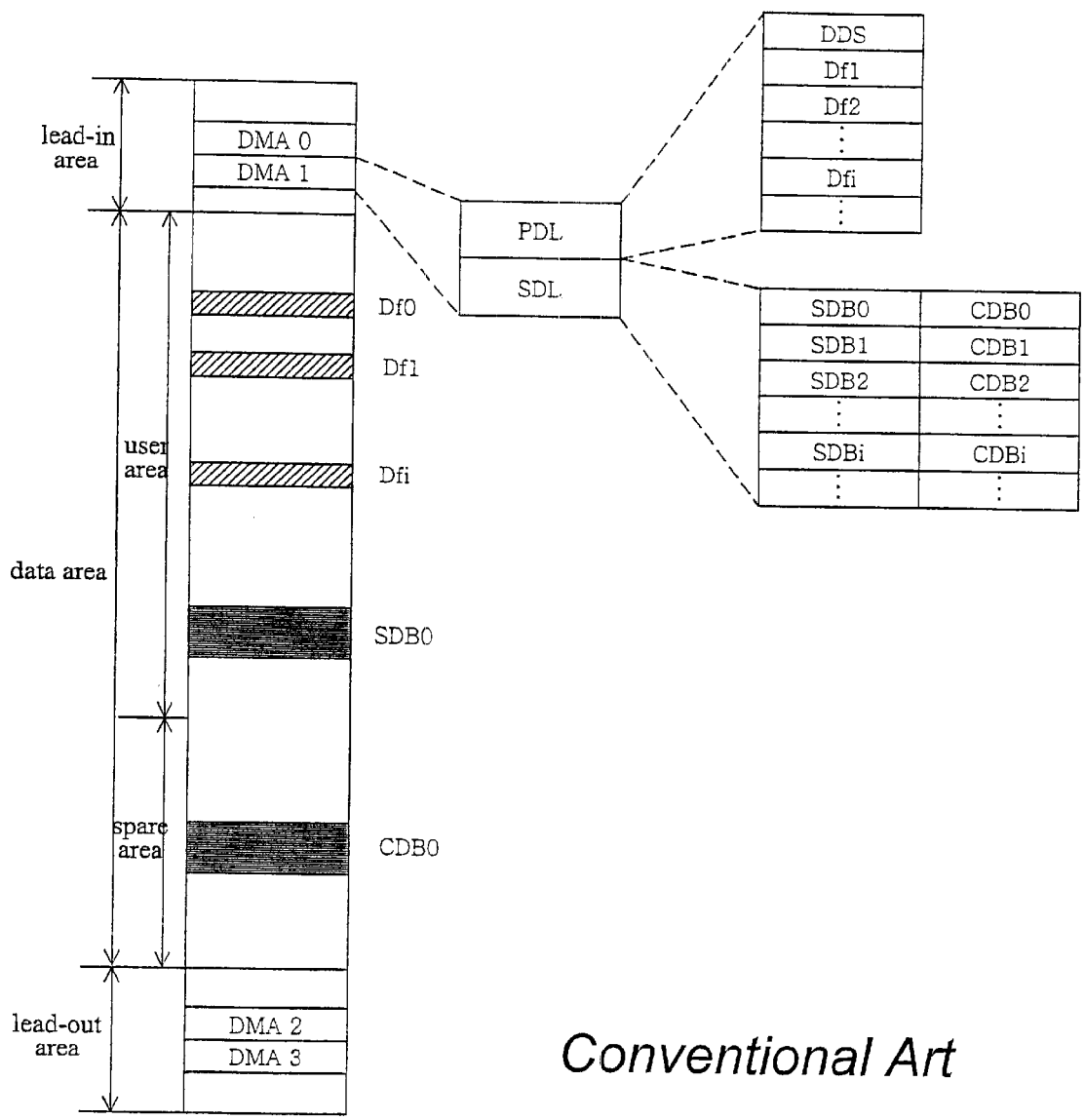
FIG. 1 is a layout figure showing the partition of rewritable area of an optical disc and defect lists.
Figure 2:
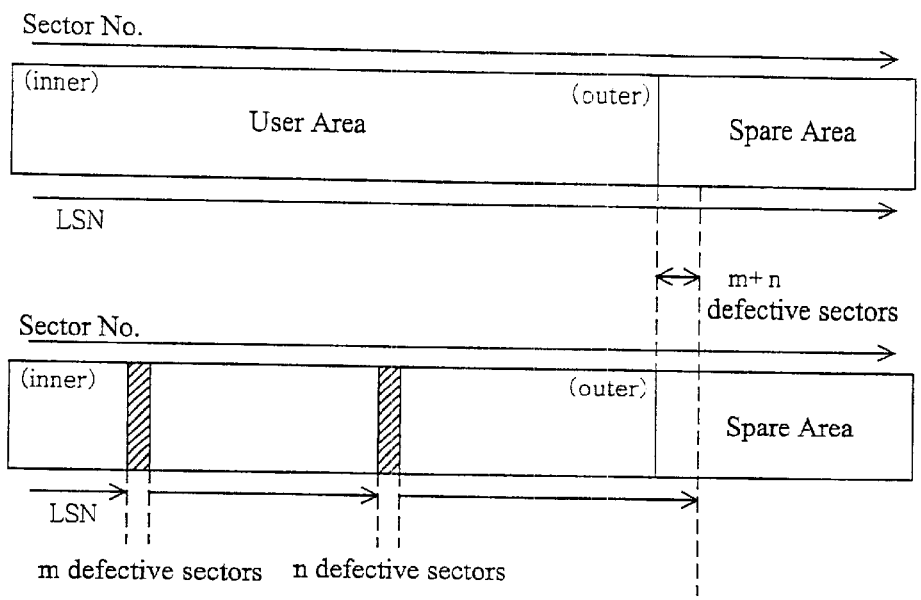
FIG. 2 is a drawing explaining slipping replacement algorithm in the write operation.
Figure 3:
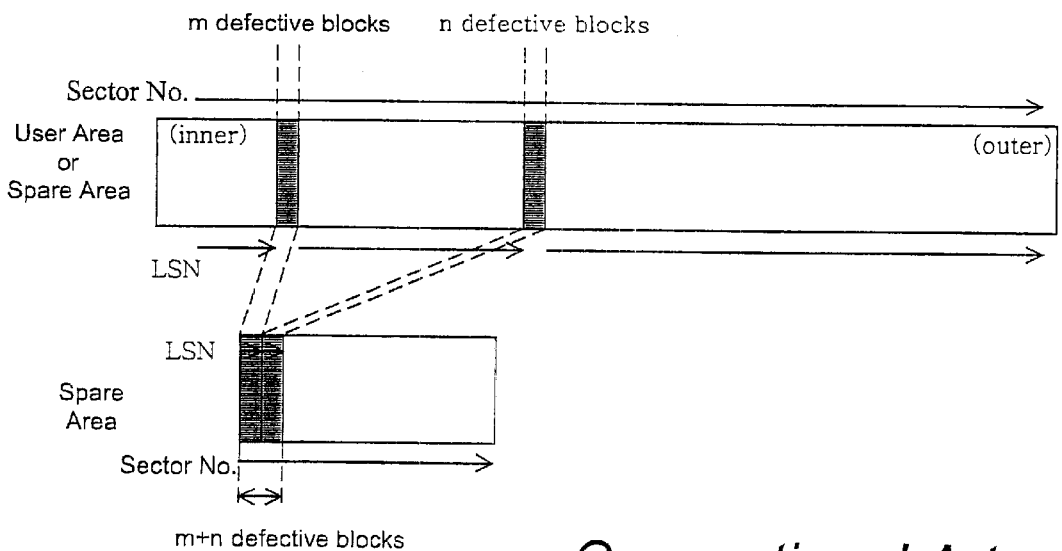
FIG. 3 is a drawing explaining linear replacement algorithm in the reproduction operation.
Figure 4:
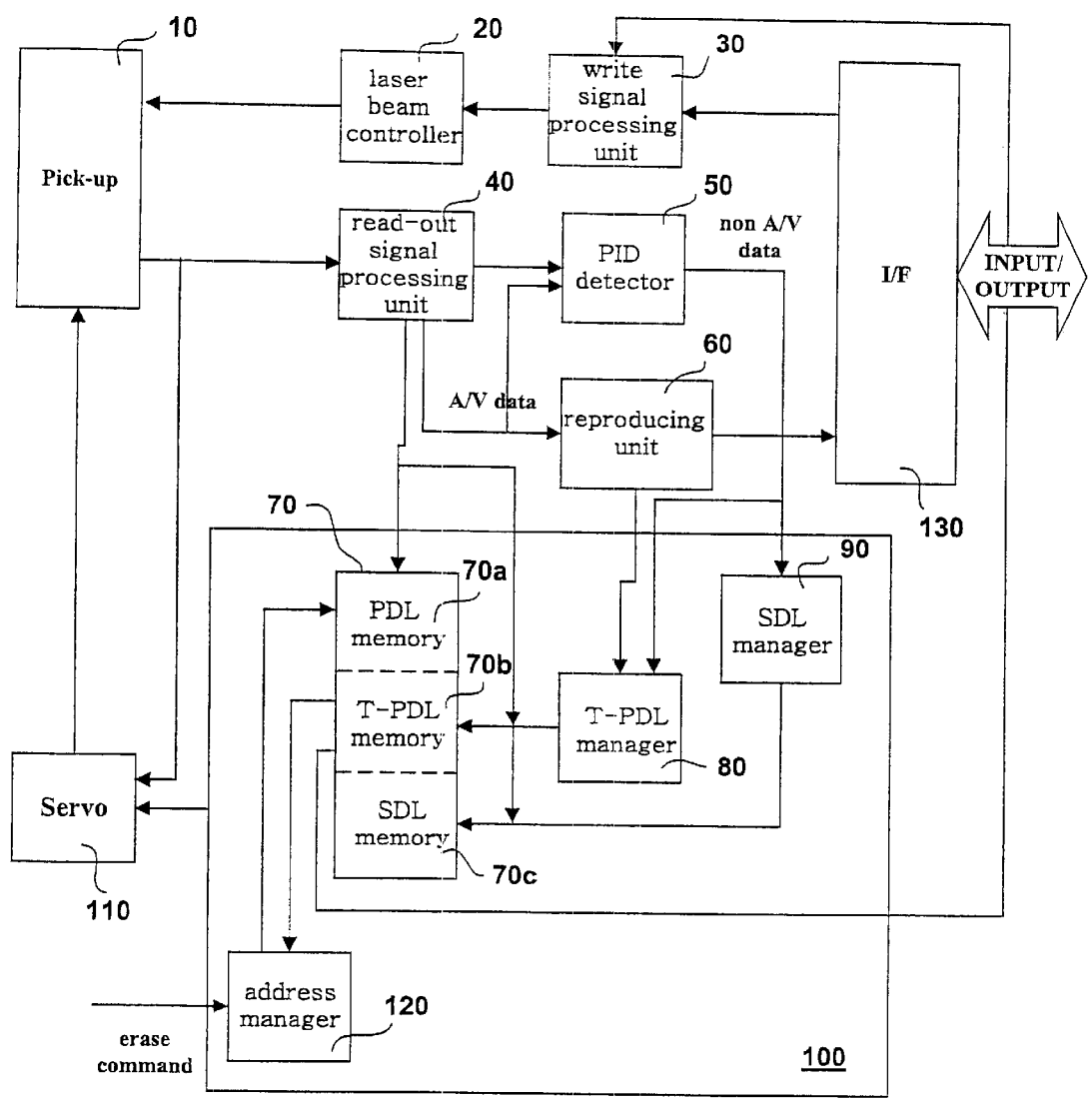
FIG. 4 is a block diagram showing a preferred embodiment of optical disc recording/reproducing apparatus of the present invention.
Figure 5:
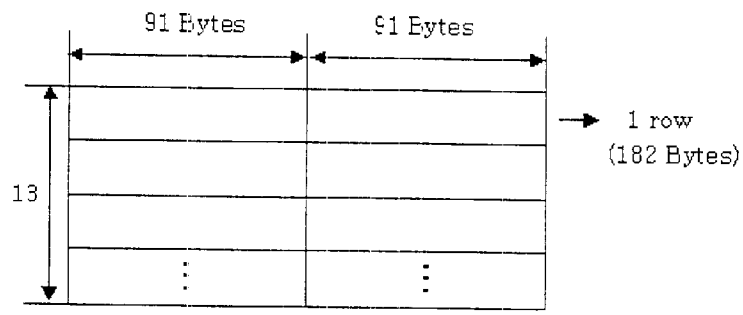
FIG. 5 shows a layout of an sector attached with ECC.
Figure 6:
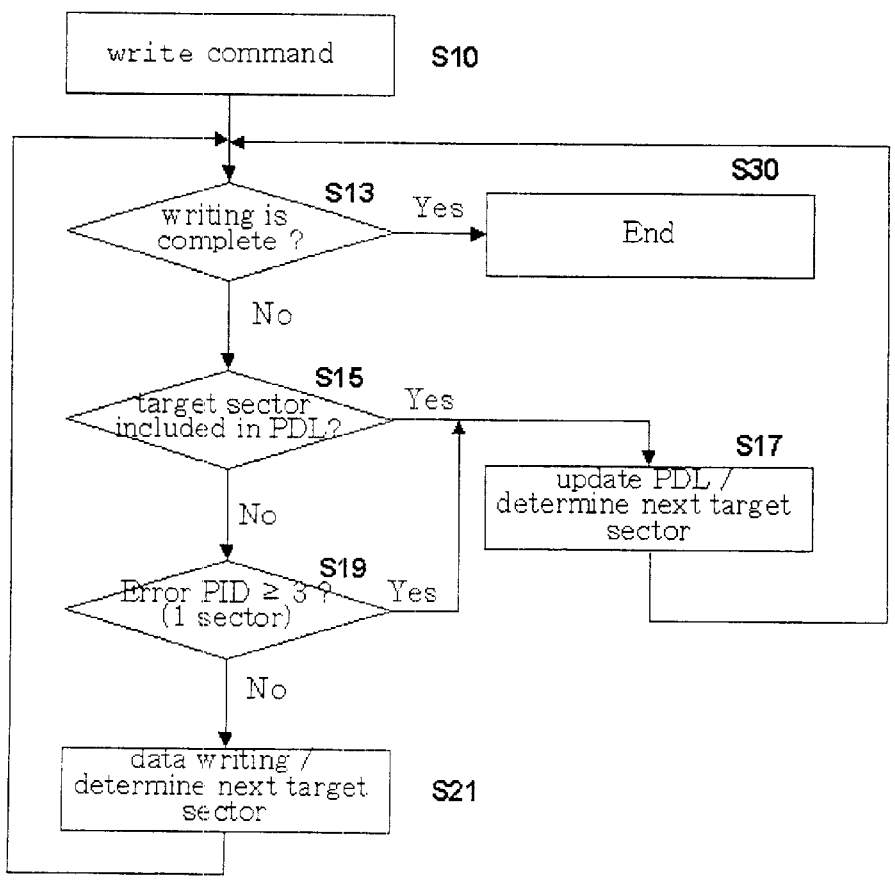
FIG. 6 is a flowchart showing the write process to the optical disc.
Figure 9:
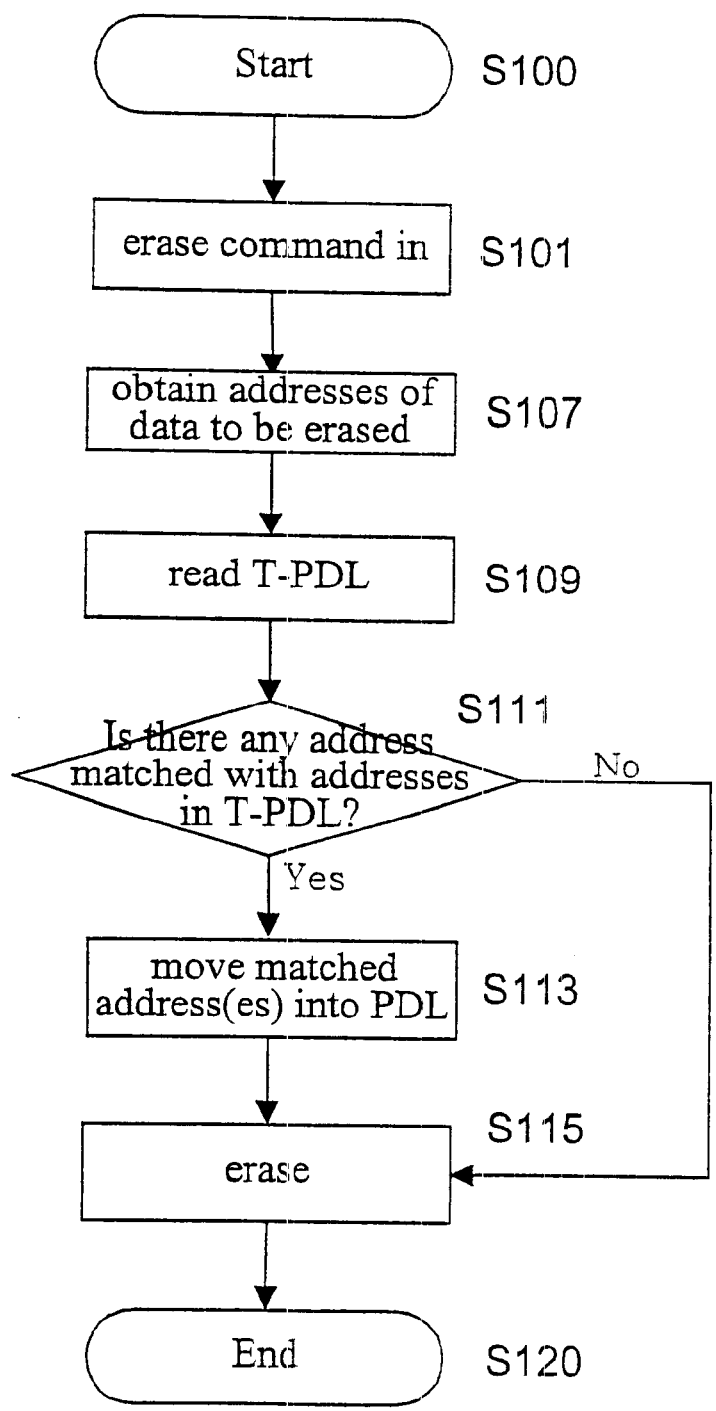
FIG. 9 is a flowchart showing the defective list updating process when A/V data is erased.

FIG. 4 depicts a partial block diagram of a VDR player embodying the creation method of defective management information according to the present invention. The VDR player comprises an optical pickup 10 for reading/writing data from/to an optical disc; a servo controller 110 for controlling the optical pickup 10; a read-out signal processing unit 40 for classifying the type of data reproduced from the optical disc; a PID detector 50 for detecting the PID of data which is read out from the disc; a SDL manager 90 for judging whether a sector is defective or not based on read-out error of the detected PID, and for selecting new defective sectors which have not been listed in the SDL by using defect information in the SDL; a reproducing unit 60 for decompressing and processing A/V data received from the read-out signal processing unit 40; an interface RAM 130 for temporarily storing the A/V data transferred to a host computer; a T-PDL (Temporary PDL) manager 80 for judging whether a sector is defective or not on the basis of read-out error of the A/V data and for selecting new defective sectors which have not been listed in the T-PDL; memory 70 for temporarily storing the PDL, SDL, and T-PDL; an address manager 120 for obtaining the physical addresses of sectors on which data to be erased are recorded, when erasing process of data is requested; a write signal processing unit 30 for moving information on the physical addresses which are matched with those stored in the T-PDL to the PDL on the optical disc; and laser beam controller 20 for controlling laser for writing data to the optical disc;

With reference to flowcharts of FIG. 6 or FIG. 9, and FIG. 4, the method for creating defective management information of an optical disc according to the present invention will be described below in detail.

Once the optical disc drive starts to reproduce the optical disc, the PDL and the SDL are read from the lead-in area of the optical disc and are then stored in a PDL-section memory 70a and a SDL-section memory 70c, respectively. Defective sectors stored in the PDL are skipped, and instead of bad sectors kept in the SDL, data is read out and reproduced from the corresponding replacement sectors Meanwhile, data which is read out from the optical disc by the optical pickup 10 is inputted to the read-out signal processing unit 40, where a classification is made as to whether the data is A/V data or not. Non-A/V data or control data is supplied to the SDL manager 90 through the PID detector 50. A decision is made as to whether the non-A/V data has read-out errors by the SDL manager. If it is determined that the non-A/V data has errors, an ECC block containing the sector(s) in which the non-A/V data is recorded is replaced by a replacement ECC block on spare area. The non-A/V data is then recorded therein. A pair of the PID of the first sector of the defective ECC block and PID of the first sector of the replacement ECC block are stored in the SDL-section memory 70c.

On the other hand, if A/V data is reproduced, the A/V data is transferred to the host computer through the reproducing unit 60 and the interface RAM 130. It is determined by the T-PDL manager 80 whether or not the A/V data has read-out errors in the unit of sector. The PIDs of sectors which are determined as defective are stored in the T-PDL section memory 70b.

Figure 10:
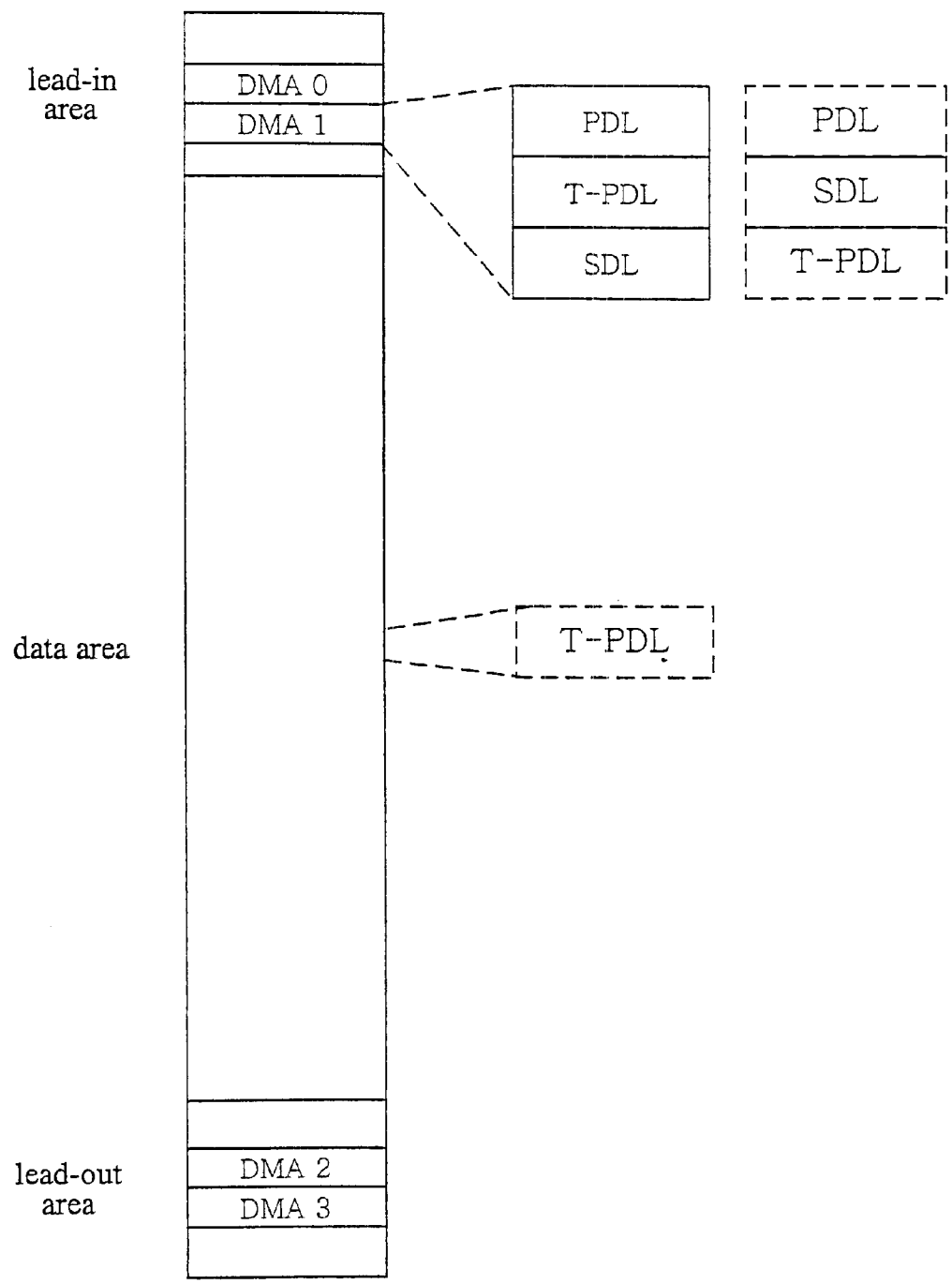
FIG. 10 is a layout figure showing the rewritable area of the optical disc according to the present invention.

In this way, The PIDs of defective sectors where A/D data is recorded are stored in the T-PDL section memory 70b, and the PIDs of defective sectors of non-A/V data are stored in the SDL-section memory 70c. After reproduction operation is completed, defect information that has been added to the T-PDL section memory and the SDL-section memory is written to respective reserved areas on the optical disc, as shown in FIG. 10. After that, when the disc is reproduced again, while defective sectors stored in the PDL and SDL are skipped, the defective sectors kept in the T-PDL are reproduced, not skipped. As a result, A/V data is reproduced in real-time without any sector replacement even if sectors containing the A/V data has been identified as defective ones.

When a user requests to erase data on the optical disc to record new data, a signal notifying erasing operation is sent to the optical disc drive. Once the signal is received, the PDL, SDL, T-PDL are all read out from the disc and are then stored in their respective memory sections 70a, 70c, 70b. The PIDs of sectors containing the data to be erased are compared to those of defective sectors stored in the T-PDL section memory 70b. If there are matched PIDs, the matched PIDs are moved from the T-PDL section memory 70b into the PDL-section memory 70a through a bus line (not shown). As a result, the defective sectors are allowed to be slipped at the time of rewriting operation and the data is prohibited from being written to the defective sectors associated with the matched PIDs. After the rewriting operation is completed, the renewed PDL is written to its reserved area on the optical disc.

On the other hand, in this embodiment of the present invention, it is possible that defective sectors in which non-A/V data is recorded may not be replaced by replacement sectors but its PID may be stored in the T-PDL section memory 70b, like defective sectors where A/V data is recorded.

The write operation according to the method for creating defective management information of the present invention is described below in detail with reference to FIG. 6, which is the same as that of the prior art method.

If a write command is inputted to the optical disc drive (S10), it is, first, checked whether or not the write operation is completed (S13). Then, the PDL stored in memory 70a is reviewed to determine if the physical address of the target sector is included in the PDL (S15).

If it is determined that the physical target address is included in the PDL, the target sector is skipped and then the next target sector is determined (S17). For the next target sector, the process from the step S13 is repeated. On the other hand, in case where it is determined in the step S15 that the target address is not included in the PDL, the target sector is examined to determine if the target sector has become defective since the last renewal of the PDL. That is, after reading out and decoding four PIDs recorded in that sector, it is checked whether or not there are three or more errors in the read-out of PID (S19).

When three or more errors in the PID read-out are detected, the corresponding sector is classified as defective one and the write operation is stopped. Next, the physical address of the defective sector newly detected is added to the PDL on the optical disc by using the write signal processing unit 30 and the laser beam controller 20. The next target address is determined (S17) and the process from the step S13 is repeated.

In case where the number of errors in the PID read-out in the target sector is less than three, that sector is considered as non-defective one. Thus, the data is written to the valid sector and the next target address is determined (S21). During the repetition of the above steps, the write operation is terminated if it is determined in the step of S13 that recording of all data is completed.

For write operation, regardless of whether or not the data to be recorded is A/V data or non-A/V data, slipping replacement is performed by referring to the PDL.

Figure 7:
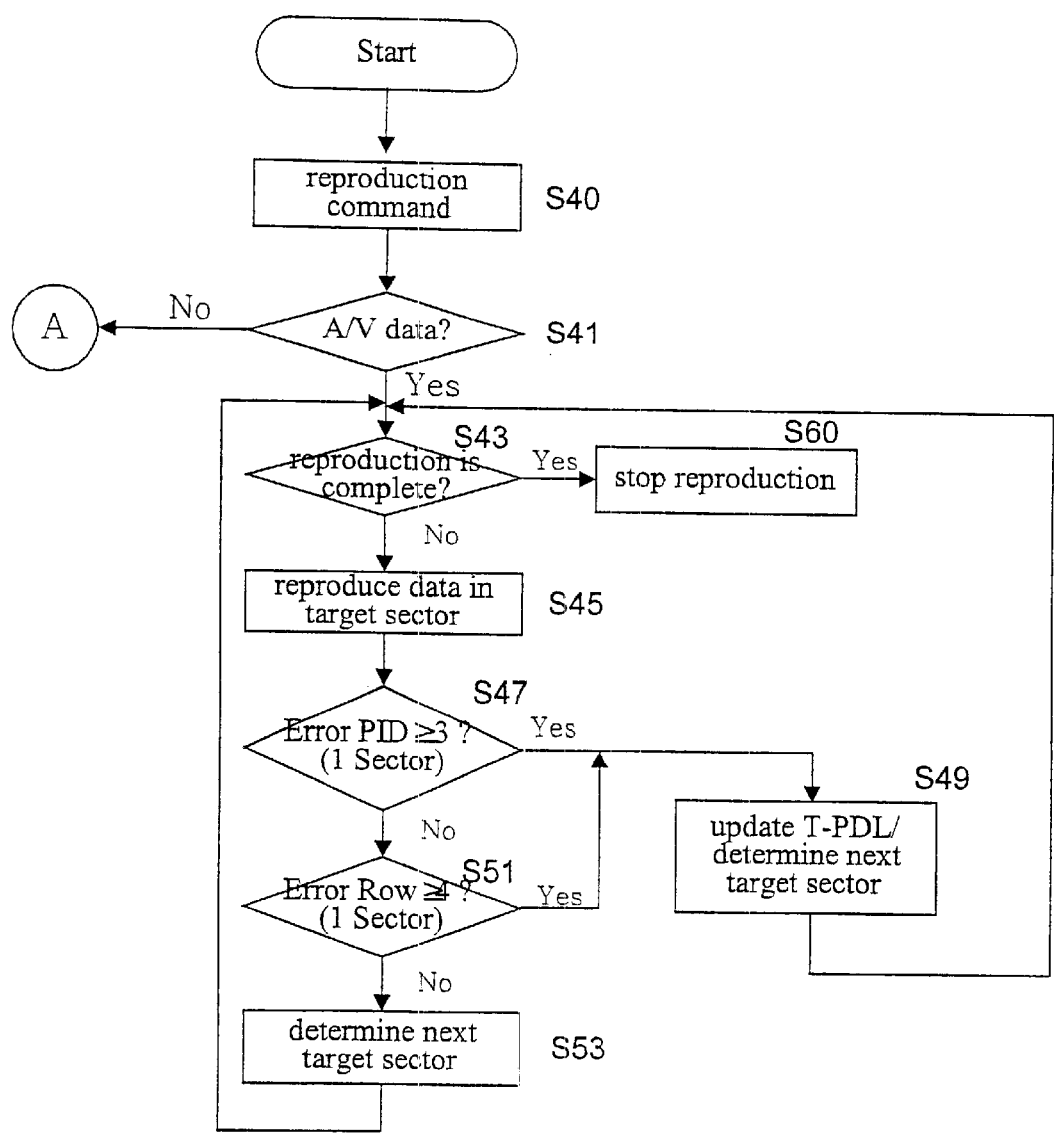
FIG. 7 is a flowchart showing the reproduction process of audio/video (A/V) data from the optical disc according to the method of creating defect management information of the present invention.
Figure 8:
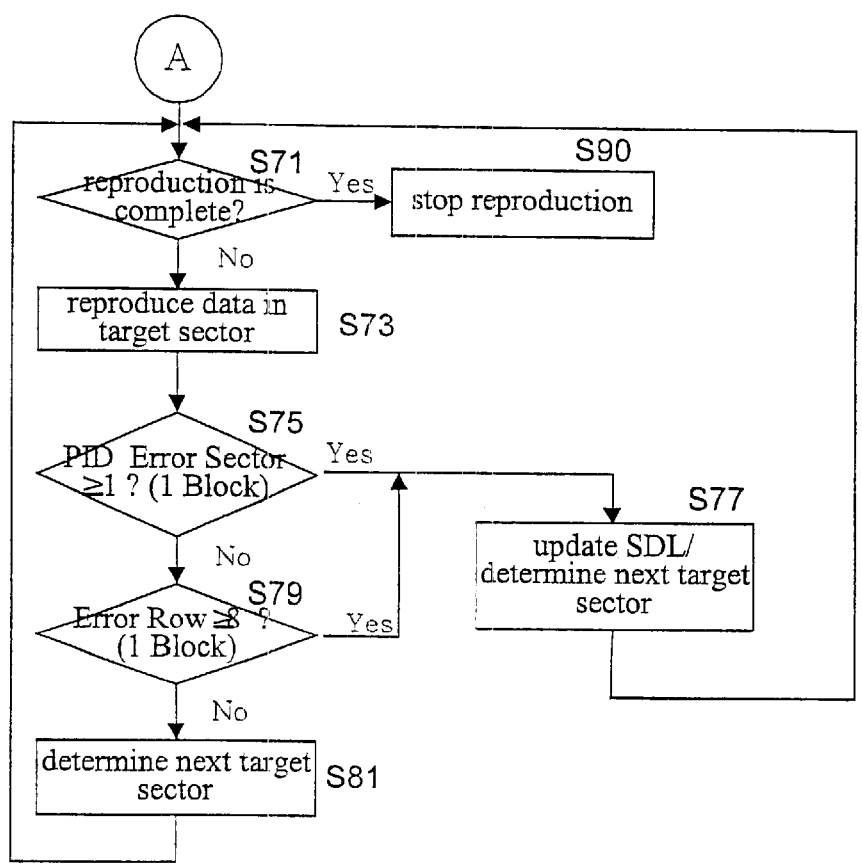
FIG. 8 is a flowchart showing the reproduction process of non-A/V data from the optical disc.

The reproduction operation according to the method for creating defective management information of the present invention is described below in detail with reference to FIGS. 7 and 8.

If a reproduction command is inputted to the optical disc drive (S40), the read-out signal processing unit 40 determines whether the data being reproduced is A/V data or non-A/V data by decoding data read out from the optical pickup 10 (S41), and outputs the data to either the PID detector 50 or the reproducing unit 60, depending on the data type.

In the case of non-A/V data, perfect reproduction is a more important factor than reproduction continuity without slight delay. It is, therefore, preferred that defective sectors corresponding to the non-A/V data are subjected to the linear replacement algorithm, as in the prior art method, which will be described below in detail.

After it is checked whether or not the reproduction is completed (S71), data is read out and reproduced from the target sector (S73). At this time, it is checked by the PID detector 50 whether or not there are one or more sectors having three or more errors in the PID read-out (hereinafter referred to as PID-error sector) in an ECC block (S75).

In case where there are one or more PID-error sectors in an ECC block, the SDL manager 90 determines the ECC block containing the PID-error sector(s) as a defective block. The defective ECC block is replaced by a non-defective replacement ECC block in the space area by the linear replacement process and then the corresponding data is recorded therein. At this time, information showing the replacement of the defective ECC block with a replacement ECC block is stored in the SDL-section memory 70c. Then, the next target sector is determined and located (S77).

Even when there is no PID-error sector, the ECC block is examined to check if there are new grown defects in the ECC block. The ECC block is regarded as a bad ECC block if the number of rows having four or more error bytes in one 182-type row is eight or more in one ECC block (S79). The bad ECC block is replaced by an replacement ECC block through the step of S77.

If the ECC block is determined as valid ECC block in the step of S79, the data which is recorded on the ECC block is reproduced and the next target sector is determined (S81) .The reproduction operation is ended if it is determined in the step of S71 that there is no more data to be reproduced.

On the other hand, when it is determined in the step of S41 that the data being reproduced is A/V data, reproduction method according to the present invention which is different from the prior art method is carried out, which will be described below in detail with reference to flowchart of FIG. 7.

First, it is checked whether or not reproduction operation is completed (S43), If not completed, data is read out and reproduced from the target sector (S45). At this time, it is checked by the PID detector 50 whether or not there are two or more errors in the PID read-out in the target sector (S47). If there are two or more PID read-out errors, the T-PDL manager 80 regards the target sector as bad one and stores the address of that sector in the T-PDL section memory 70b. Next, the next target address is determined and the optical pickup is moved to the next target sector (S49)

Even when the number of errors in the PID read-out is less than two, whether the target sector is bad or not is examined by checking if the number of rows having four or more error bytes is four or more in one sector (S51). The sectors determined as bad ones are stored in the T-PDL memory section 70b, as well. Next, the next target sector is determined (S49).

If the target sector is classified as valid one in the step of S51, just the next target sector is determined and the optical pickup is moved to that target sector (S53). Finally, the reproduction operation is ended if it is determined in the step of S43 that there is no more A/V data to be reproduced.

In short, if sectors where non-A/V data is recorded are judged as bad ones, the sectors are replaced with valid sectors on the spare area, so that the non-A/V data are reproduced without read-out error from the next reproduction. On the other hand, in case of sectors where A/V data is recorded, when the sectors are determined as bad ones, no sector replacement is carried out to enable real-time reproduction. Instead, the addresses of the bad sectors are kept in a reserved area on the optical disc which is separated from the reserved area for the PDL and SDL.

If A/V data on the optical disc is reproduced repeatedly, the T-PDL section memory 70b comes to store the addresses of bad sectors which are newly detected during reproduction operation. Such information on new bad sectors is written to a reserved area for the PDL on the optical disc when an erase command is issued by a user, which will be explained below with reference to flowchart of FIG. 9.

If an erase command is inputted to the optical disc drive (S101), the physical addresses of sectors in which the data to be erased is recorded are obtained by the address manager 120 (S107). Next, the physical addresses stored in the T-PDL section memory 70b are read out (S109) and then the addresses obtained by the address manager 120 are compared with those of bad sectors in the T-PDL section memory (S111). If there is no matched address, the erasing process is made (S115). If there are at least one matched addresses, the matched addresses stored in the T-PDL section memory 70b are moved into the PDL-section memory 70a through the bus line (S113) and then the erasing process is made (S115).

As shown in FIG. 10, a reserved location on the optical disc for the T-PDL can be arranged such that it lies in the data area, separated from the PDL and SDL, or in DMA of the lead-in-area together with the PDL and SDL. The former arrangement has an advantage of preserving the existing defect management information area for the PDL and SDL. In this arrangement, it is preferred that the space for the T-PDL is reserved at a location before or behind the area for storing a program menu information, which is accessed repeatedly in writing or reproduction operation. In the latter arrangement, the order in which three defect lists lies in the DMA can be changed.

The bad sectors, addresses of which are moved from the T-PDL section memory 70b to the PDL-section memory 70a, are slipped by the slipping replacement algorithm when new data is rewritten to the optical disc after erasing operation is completed. As a result, data is prohibited from being written to the bad sectors.

The foregoing is provided only for the purpose of illustration and explanation of the preferred embodiments of the present invention, so changes, variations and modifications may be made without departing from the spirit and scope of the invention.

What is claimed is:

1. A recording medium comprising:
   a data area including a good data block and a defective data block;
   a defect management area including an information for identifying at least a pre-specified defective data block; and
   a replacement area for replacing the defective data block, wherein the replacement area is used for replacing a defective data block based on a type of data in the data block, such that if the type of the data is non-real time data then the defective data block is replaced with a data block in the replacement area, and if the type of the data is real time data then the defective data block is not replaced, at least in a reading mode.

2. The recording medium of claim 1, wherein the data block recorded on the data area is real-time data.

3. The recording medium of claim 1, wherein the information of the defect management area is updated when a new defective data block is found in reading mode.

4. The recording medium of claim 1 further comprising:
   information for indicating whether or not the defective data block is replaced by the data block in the replacement area.

5. A recording medium, comprising:
   a data area including a good data block or a defective data block;
   a defect management area including an information for identifying at least the defective data block; and
   a replacement area including an replacement block for the defective data block,
   wherein the defect management area also includes an information signifying whether or not a replacement of the defective data block into the replacement area is made.

6. The recording medium of claim 5, wherein the data block recorded on the data area is real-time data.

7. The recording medium of claim 5 wherein the information of the defect management area is updated when a new defective data block is found in reading mode.

8. The recording medium of claim 5, wherein the signifying information is set based on a type of data written or read from the recording medium, wherein the information signifies that the defective data block is not replaced by a data block in the replacement area, if the data is real-time data, and wherein the information signifies that the defective data block is replaced by a data block in the replacement area, if the data is non-real-time data.

9. A method for creating and writing defect management information of an information recording medium, comprising the steps of:
   detecting the presence of a defective area in the information recording medium;

determining whether to replace data in the detected defective area into a replacement area; and creating and writing information signifying whether or not a replacement of the detected defective area is performed.

10. The method of claim 9, further comprising replacing the data in the defective area into the replacement area based on a type of data.

11. An apparatus for creating and writing defect management information of an information recording medium, comprising:

means for detecting the presence of a defective area in the information recording medium;

means for determining whether to move data in the detected defective area into a replacement area and creating and writing information signifying whether or not a replacement of the detected defective area is made.

12. The apparatus of claim 11, wherein the control unit further determines whether the data is moved into the replacement area based on a type of the data.

13. The apparatus of claim 12, wherein the control unit records information signifying whether or not a replacement of the detected defective area is made based on the type of the data.

14. The apparatus of claim 13, wherein the control unit prevents the data from being moved into the replacement area, if the type of data is real-time data, and wherein the control unit causes information signifying that a replacement of the detected defective area is not made to be recorded.

15. The apparatus of claim 13, wherein the control unit causes the data to be moved into the replacement area, if the type of data is non real-time data, and wherein the control unit causes information signifying that a replacement of the detected defected area is made to be recorded.

16. The apparatus of claim 12, wherein the control unit prevents the data from being moved into the replacement area, if the type of data is real-time data, and wherein the control unit causes information signifying that a replacement of the detected defective area is not made to be recorded.

17. The apparatus of claim 12, wherein the control unit causes the data to be moved into the replacement area, if the type of data is non real-time data, and wherein the control unit causes information signifying that a replacement of the detected defected area is made to be recorded.

18. A method for creating and writing defect management information of an information recording medium, comprising the steps of:

detecting the presence of a defective area in the information recording medium;

determining whether to move data in the detected defective area into a replacement area for real time data; and creating and writing an information signifying whether or not a replacement of the detected defective area is made.

19. A method for creating and writing defect management information of an information recording medium, comprising the steps of:

detecting the presence of a defective area in the information recording medium;

determining whether to move data in the detected defective area into a replacement area;

detecting type of data stored in the defective area;

moving the data in the detected defective area into the replacement area if the data is non-real-time data; and recording information signifying whether or not a replacement of the detected defective area is made.

20. The method of claim 19 further comprising:

detecting type of data stored in the defective area; and preventing the data in the detected defective area from being moved into a replacement area, if the data is real-time data.

21. The method of claim 19 further comprising:

detecting type of data stored in the defective area; and moving the data in the detected defective area into a temporary replacement area, if the data is real-time data.

22. The method of claim 19 further comprising:

detecting type of data stored in the defective area;

moving the data in the detected defective area into a replacement area, if the data is non-real-time data;

recording an information signifying whether or not a replacement of the detected defective area is made; and reproducing the data.

23. The method of claim 19 further comprising:

detecting type of data stored in the defective area; and reproducing the data.

24. The method of claim 19, further comprising recording information signifying that a replacement of the data in the detected defective area is made, if type of data is non real-time data and the presence of a defective block is detected.

25. A method for recording defect management information for an information recording medium, the method comprising:

detecting type of data and presence of a defective area in an information recording medium;

preventing the data in the detected defective area from being stored in a replacement area, if the data is real-time-data;

storing the data in the replacement area, if the data is non-real-time data; and recording an information signifying whether or not the data in the detected defective area is stored in the replacement area based on a type of data.

26. A recording medium comprising:

a data area comprising a good data block and a defective data block;

a defect management area comprising information for identifying at least a pre-specified defective data block;

a replacement area for replacing the defective data block, wherein the replacement area is used for replacing a defective data block found in a reading mode, if type of data read is non-real-time data; and information for indicating whether or not the defective data block is replaced with a block of the replacement area, wherein the information indicates that the defective block is replaced with a block of replacement area, if the type of data block is non real-time data, and wherein the information indicates that the defective block is not replaced into a block of replacement area, if the type of data block is real-time data.

27. A method for creating and writing defect management information of an information recording medium, the method comprising:

detecting the presence of a defective area in an information recording medium;

controlling data in the detected defective area such that the data is not moved into a replacement area for real time data; and writing information signifying that a replacement for the data in the defective area is not made.

28. The method of claim 27, wherein the controlling step further comprises:

controlling the data in the detected defective area such that the data is moved into a replacement for non real time data; and writing information signifying that a replacement for the data in the defective area is made.

* * * * *